Oct. 26, 1965 R. K. RICHARDS 3,214,679

SUPERCONDUCTIVE TRANSFORMER SYSTEM

Original Filed July 29, 1959

INVENTOR.
RICHARD K. RICHARDS

BY

Norman C. Fulmer
Att'y.

United States Patent Office 3,214,679

Patented Oct. 26, 1965

3,214,679

SUPERCONDUCTIVE TRANSFORMER SYSTEM

Richard K. Richards, 1821 Allen Ave., Ames, Iowa

Continuation of application Ser. No. 830,389, July 29, 1959. This application Apr. 13, 1964, Ser. No. 360,480
8 Claims. (Cl. 323—44)

This application is a continuation of my copending application Serial No. 830,389, filed on July 29, 1959, now abandoned.

This invention relates to transformers for transforming an electrical signal of a given current or voltage to a signal of lower or higher current or voltage. More specifically, the invention relates to a new kind of transformer having superconductive elements.

Transformers conventionally employ windings that are inductively coupled together. The windings surround a core usually of iron or other material having suitable magnetic properties. In operation, a varying current in one winding creates a varying magnetic field that links the turns of another winding, and this varying magnetic field causes a current to flow in the other winding. As is well known, only a varying (or alternating) current can be transformed in a conventional transformer, and conventional transformers cannot be used with signals of zero frequency, i.e., direct-current signals.

The new transformer of this invention employs one or more superconductive elements. There are certain materials which have zero resistance when at a sufficiently low temperature. Such materials are said to be "superconductive" or "superconductors." For example, tantalum is superconductive at temperatures below 4.2 degrees K. Also, niobium is superconductive at temperatures of a few degrees K.

An object of this invention is to provide a new transformer structure employing one or more superconductive elements.

Another object is to provide a transformer that is operable for signals over a wide frequency range, this wide frequency range including zero frequency, i.e., direct-current signals.

A further object is to provide a transformer that is operable at very low temperatures and hence is useful in computer machines employing cryotrons or other superconductive devices which are maintained at low temperatures.

Still another object is to provide a transformer in which substantially no heat is generated by the currents flowing therein.

Yet another object is to provide a transformer that can be constructed by using printed-circuit techniques.

Other objects are to provide a transformer that is small, rugged, inexpensive, light in weight, and that has a high degree of coupling. Still other objects will be apparent.

The above objects are achieved by the invention described in the following disclosure and claims, with reference to the accompanying drawing.

The invention comprises, basically, a first element in the form of a plurality of elongated regions of electrically conductive material, these regions being connected electrically in series, and a second element consisting of a plurality of elongated regions of electrically conductive material respectively positioned alongside the different regions of the first element, the elongated regions of the second element being connected electrically in parallel, and at least one of the first and second elements being superconductive.

Figure 1:
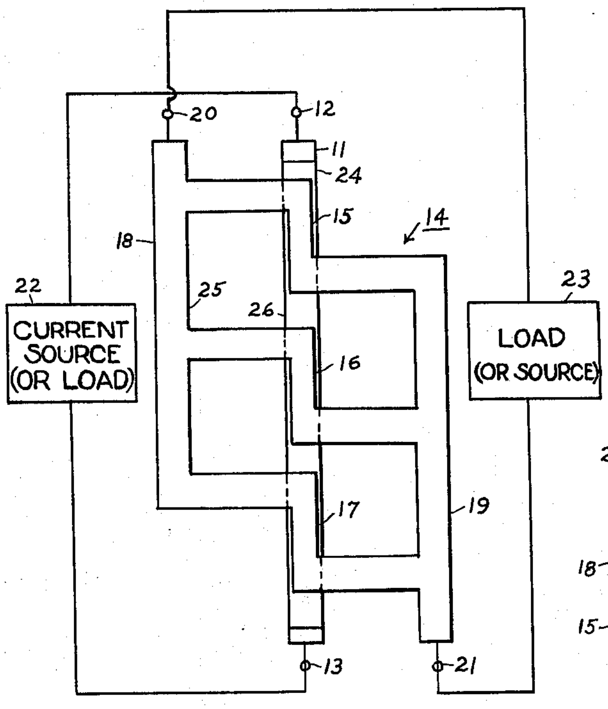
FIGURE 1 is a front view of a preferred embodiment of the invention.
Figure 2:
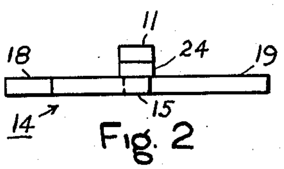
FIGURE 2 is a top view of FIGURE 1.
Figures 3, 4, 5:
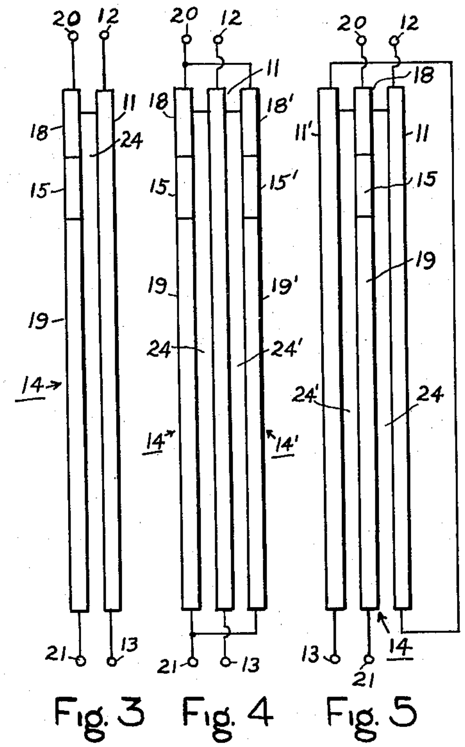
FIGURE 3 is a side view of FIGURE 1.
FIGURE 4 is a side view of an alternative embodiment of the invention.
FIGURE 5 is a side view of another alternative embodiment of the invention.

In the transformer shown in FIGURES 1–3 of the drawing, a straight flat strip 11 of superconductive material is connected electrically between terminals 12 and 13. Superposed over strip 11 is a set of superconductive elements and interconnecting leads formed from a single sheet 14 of superconductive material. Three active regions are indicated by the numerals 15, 16, and 17. Each region consists of a strip lying alongside and parallel to a region or segment of strip 11. The remainder of this sheet of material forms the connections 18 and 19 between regions, with corresponding ends of the regions being connected to terminals 20 and 21, respectively.

A source or load 22 is connected across the terminals 12 and 13. A load or source 23 is connected across the terminals 20 and 21. In any given application, only one of 22 and 23 is a source, the other being a load. Preferably the entire circuit to the load, including the load itself, is superconductive.

The elements 15, 16, and 17 are in close proximity to the strip 11 but are electrically insulated therefrom by a suitable film or strip of insulation 24 which may be, for example, enamel or a plastic. For convenience, the assembly of elements 15, 16, and 17 may be called the "parallel-connected elements," and the corresponding regions of the strip 11 may be called the "series-connected elements."

Assume that 22 is a current source and that 23 is a load. A current from source 22 will flow through the element 11 and in so doing it will induce current in each of regions 15, 16, and 17 because of the phenomenon whereby a superconductor inhibits the passage of flux lines through it or the establishment of flux lines surrounding it, this being accomplished by a current flow in the superconductor. Because of the parallel connection of regions 15, 16, and 17 and because of the similarity of dimensions of these three elements, the induced current in any one of the elements cannot flow through any of the other elements. Instead, the sum of the currents in the three elements flows through the load. A step-up in current is thereby achieved. In this mode of operation, element 11 is the "primary" and element 14 is the "secondary" of the transformer.

Now assume that 23 is a current source and 22 is a load. The current from source 23 will divide equally in the three branches 15, 16, and 17, provided the impedances in these three branches are equal. In the case of superconductors, the resistance is zero, and the current therefore divides in inverse proportion to the amount of inductance in the various branches in the circuit. With the geometry shown, the inductances will be approximately equal. For exact equality, minor variations in branch path length can be introduced if this is necessary, but the principles of operation are not affected. Because of the series connection of the regions of the strip 11 lying under the regions 15, 16, and 17, a step-down in current is obtained for the signal transmission in this direction. However, since any voltages induced in these regions of strip 11 are in series, there is a step-up in voltage. In this mode of operation, element 14 is the "primary" and element 11 is the "secondary" of the transformer.

The transformer of the invention operates on an entirely different principle than conventional transformers. Whereas a conventional transformer requires that the primary produce a varying magnetic field that links turns of the secondary, thereby inducing a varying current in the secondary, if the secondary "winding" is superconductive, as in the present invention, a magnetic field cannot link the secondary because of a phenomenon sometimes known as the Meissner effect whereby the lines of flux of a magnetic field cannot penetrate a superconductor. This inability to penetrate is due to the fact that an infinite current would tend to be generated in a superconductive secondary, which in turn would create an infinite magnetic field in opposition to that generated by the primary, the net result being a completely cancelled magnetic field, i.e., zero magnetic field, in the superconductive secondary. Therefore, it would appear that a transformer cannot function if its secondary is superconductive. However, in the transformer of this invention, although there is no magnetic field at the secondary as in a conventional transformer, a current occurs in the secondary of a value to generate a magnetic field that will cancel out the magnetic field produced by the primary, and this secondary current will be alternating if the primary current is alternative, and will be steady (zero frequency; i.e., direct current) if the primary current is steady. That there will be a steady secondary current in the presence of a steady primary current (in contrast to prior art normal resistance transformers, which will not function under direct current conditions) is a result of the fact that with the transformer of this invention the secondary in the preferred embodiment is maintained superconducting at all times under all conditions of current flow encountered in the operation of the device. It is herein assumed that the said steady primary current is established after the device is cooled to cause the superconductive phenomenon to exist; if the steady primary current were to be established prior to the cooling, there would not be any secondary current after the cooling, but in this case a steady secondary current would be generated by any change in the value of the steady primary current. Thus, it is seen that conventional transformers function by means of magnetic flux lines linking the secondary, whereas the transformer of this invention functions by means of a cancellation of magnetic flux lines at the secondary.

With both the primary and secondary elements of the transformer comprised of superconductive material, the transformer can be of extremely small size even though relatively large currents are involved. The reason that a unit of small size is capable of handling large currents is, of course, a direct result of the fact that the zero-resistance nature of the superconductors prevents the occurrence of resistive losses, and hence no heat will be generated as a result of resistive losses. The transformer may be constructed inexpensively by stamping the primary and secondary elements from sheets of suitable material or by depositing (by any of several processes) suitable patterns of material, with a layer of insulation between, on a supporting surface. Suitable superconductive materials are, for example, tantalum and niobium. These materials are maintained at a suitable low temperature by placing the transformer in a cold chamber or liquid.

Figure 6:
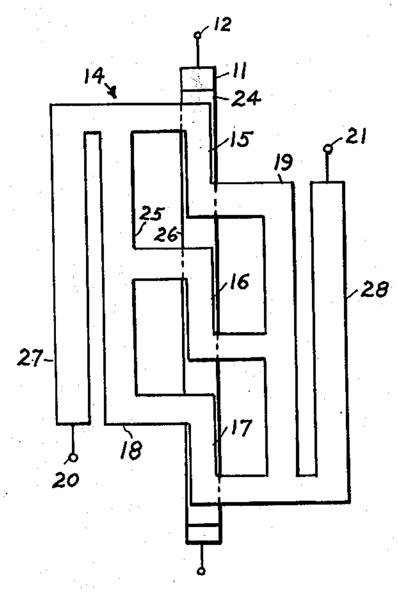
FIGURE 6 is a front view of a modification of the invention.

With the geometry as shown in FIGURES 1–3, a certain amount of "leakage coupling," caused by induced currents, will occur between the primary and secondary, such as between the regions 25 and 26. This coupling can be minimized by making the dimensions such that the distance between these regions is relatively great. Alternatively, the leads to the load or source 23 can be folded back over region 25 and corresponding regions, as shown by the folded back leads 27 and 28 in FIGURE 6, to effect a substantial cancellation of the unwanted induced currents.

The width of the strip 11 and the width of the regions 15, 16, and 17 need not be the same.

One or more additional strips similar to the strip 11, or similar to the element 14 and comprising regions 15, 16, and 17, may be placed congruent to the corresponding strip or regions, and insulated therefrom, to provide an additional primary or secondary element of the transformer. These additional elements may, if desired, be connected in electrical series or parallel with other elements, to obtain different values of transformer ratio. For example, FIGURE 4 shows a construction in which two "parallel" elements 14 and 14' are aligned alongside two sides of a single "series" strip 11, these elements 14 and 14' being connected electrically in parallel as shown. Also, a plurality of "series" strips 11 can be positioned alongside a single "parallel" element 14 and connected in series to form a "winding" as shown in FIGURE 5, where 11 and 11' are two "series" strips arranged alongside the two sides of a single "parallel" element 14 and connected in electrical series. In these arrangements the effective transformation ratio is increased to equal the product of the "turns ratio" and the "series-parallel ratio."

In some applications it may be desirable to mount planar superconductive elements over the transformer structure, or under the structure, or both, to control the stray flux lines that would otherwise exist.

Although flat strips have been shown for the various elements of the transformer, the operation of the transformer is not limited to elements of this configuration. Any cross-sectional geometry for the elements may be employed without departing from the principles of the invention, and the assembly of elements may be bent or curved into various shapes or configurations as may be convenient or desirable.

In the transformer of this invention, the current in the "secondary" element is established at the same time that current is established in the "primary," and the secondary current remains as long as the primary current is applied. This mode of operation is quite different from the mode of operation of a conventional transformer where the induced voltage in the secondary is proportional to the rate of change of flux linkages and therefore disappears when the primary current is a constant value.

In the transformer of this invention, it is not necessary that the "primary" element or any of the circuits connected to it be superconductive. Except for the resistive heat losses, the transformer functions in the same manner when the primary element is comprised of ordinary conductive material as when it consists of a superconductive material.

Although three parallel paths for the element 14 are shown in the drawing, the invention is not limited to this number. Any number of parallel paths greater than one may be used. Various geometrical arrangements for the coupled elements and their interconnecting leads can readily be devised in accordance with the principles of the invention.

The transformer of this invention is useful in digital computer machines which employ cryotrons or other low-temperature superconductive elements. The transformer is used where it is desired to step the value of signal current up or down in value, either between stages, or at the input or output of a group of stages, or in feedback loops. The transformers may be placed directly in the refrigerated regions of such a computer machine.

Although preferred embodiments of the invention have been shown and described, other embodiments and modifications thereof will be apparent to persons skilled in the art and will fall within the scope of the claims.

What is claimed is:

1. A transformer comprising a first plurality of elongated electrically conductive elements in a series connection, a second plurality, equal to said first plurality, of elongated electrically conductive elements in a parallel connection, where each element of said second plurality is respectively alongside one element of said first plurality, where the resulting pairs of elements are connected to have the same relative polarity with respect to their respective said series and parallel connections, where the elements of at least one of said pluralities is maintained superconductive, and where the connection comprising said one of pluralities is connected at its electrical ends to a superconductive load.

2. A transformer as in claim 1 where the elements of said first plurality are planar and are all in a first plane and where the elements of said second plurality are planar and are all in a second plane physically parallel to said first plane.

3. A transformer as in claim 2 where the elements of said first plurality are comprised of regions of a single planar strip of electrically conductive material.

4. A transformer as in claim 1 where the elements in said second plurality and the electrical paths forming said parallel connection are all comprised of a single planar structure.

5. A transformer comprising a first elongated electrically conductive element and a plurality of elongated elements each parallel to and in close proximity to said first elongated element, means connecting said plurality of elongated elements in a series connection with the polarity of connection for each element in said plurality being the same with respect to said first elongated element, where the elements in said plurality are maintained superconductive, and where said series connection is connected at its electrical ends to a superconductive load.

6. A transformer comprising a first elongated electrically conductive element and a plurality of elongated elements each parallel to and in close proximity to said first elongated element, means connecting said plurality of elongated elements in a series connection with the polarity of connection for each element in said plurality being the same with respect to said first elongated element, where said first element is connected at its electrical ends to a superconductive load.

7. A transformer as in claim 5 where said first element and said plurality of elements are all planar and are all in mutually parallel planes.

8. A transformer as in claim 6 where said first element and said plurality of elements are all planar and are all in mutually parallel planes.

References Cited by the Examiner

UNITED STATES PATENTS

| | | | |
|---|---|---|---|
| 3,090,023 | 5/63 | Brennemann et al. | 338—32 |
| 3,173,079 | 3/65 | McFee | 323—44 |

LLOYD McCOLLUM, *Primary Examiner.*